United States Patent
Chan et al.

(10) Patent No.: US 10,625,880 B1
(45) Date of Patent: Apr. 21, 2020

(54) AIRCRAFT TUG WITH LATCH AND TURNTABLE

(71) Applicants: Anthony Chan, Chino, CA (US); Tracy Haeggstrom, Chino, CA (US)

(72) Inventors: Anthony Chan, Chino, CA (US); Tracy Haeggstrom, Chino, CA (US)

( * ) Notice: Subject to any disclaimer, the term of this patent is extended or adjusted under 35 U.S.C. 154(b) by 0 days.

(21) Appl. No.: 16/209,881

(22) Filed: Dec. 4, 2018

(51) Int. Cl.
  *B64F 1/24* (2006.01)
  *B62D 55/06* (2006.01)
  *B64F 1/22* (2006.01)

(52) U.S. Cl.
  CPC .............. *B64F 1/24* (2013.01); *B62D 55/062* (2013.01); *B64F 1/227* (2013.01)

(58) Field of Classification Search
  CPC ........... B64F 1/24; B64F 1/227; B62D 55/062
  See application file for complete search history.

(56) References Cited

U.S. PATENT DOCUMENTS

| | | | | |
|---|---|---|---|---|
| 8,544,792 B2 * | 10/2013 | Perry | ...................... | B64C 25/50 180/6.2 |
| 8,774,983 B2 * | 7/2014 | Perry | ...................... | B64F 1/22 244/50 |
| 9,022,317 B2 * | 5/2015 | Perry | ...................... | B64C 25/50 244/50 |
| 9,085,374 B2 * | 7/2015 | Decoux | ...................... | B64F 1/22 |
| 9,199,745 B2 * | 12/2015 | Braier | ...................... | B64F 1/22 |
| 2003/0095854 A1 * | 5/2003 | Abela | ...................... | B64F 1/22 414/426 |

* cited by examiner

*Primary Examiner* — Kaitlin S Joerger
(74) *Attorney, Agent, or Firm* — Edwin Tarver

(57) ABSTRACT

An aircraft tug apparatus for tugging an aircraft by an aircraft tire includes a turntable on a main base portion of the tug, capable of rotational movement relative to the main base portion. A tire cradle assembly on the turntable releasably holds the aircraft tire, and a latch mechanism holds the tire cradle assembly in a position that confines the aircraft tire. A pivoting arm coupled to the main base portion extends under the turntable. The pivoting arm includes a first plunger and a second plunger extending therefrom, with the first plunger coupled to the pivoting arm using a spring assembly allowing it to move up and down relative to the pivoting arm. The spring assembly is configured such that the pivoting arm may move the second plunger to engage the latch mechanism while the first plunger is impinged by the turntable.

20 Claims, 9 Drawing Sheets

AIRCRAFT TUG WITH LATCH AND TURNTABLE

BACKGROUND

The present apparatus generally relates to aircraft accessories and aircraft tug vehicles. More specifically, the present invention relates to an aircraft tug having a turntable capable of both locked anti-rotational and unlocked rotational towing of an aircraft.

Aircraft tug apparatus are well known in the art. For smaller, non-commercial aircraft in particular, these apparatus typically comprise a main body portion having a low platform, the main body portion bounded by wheels or tracks. A releasable locking cradle is installed on the main body portion, such that when an aircraft front tire is driven onto the main body portion, the cradle locks the tire in position and the tug can pull the aircraft to a desired location.

In some instances, and aircraft tug may have a turntable installed on the main body portion. With the releasable locking cradle installed on the turntable, the tug can turn independently of an aircraft tire installed thereon. This leads to greater maneuverability of the aircraft. After moving the aircraft into a desired storage location, the aircraft tug can be realigned, i.e., brought back into parallel with the direction of travel of the aircraft tire, and the aircraft released from the tug.

A problem exists in the current state of the art, in that latching and unlatching an aircraft tire on such tugs is difficult. This is because the turntable must be locked and unlocked in addition to, and sometimes cotemporaneously with locking and unlocking the cradle. Due to aircraft weight, pressure from the turntable locking mechanism on the turntable serves to prevent the cradle locking mechanism from releasing the cradle.

Hence, what is needed is an aircraft tug with a turntable locking and cradle release mechanism that allows the cradle to be released, even when substantial impinging pressure is brought to bear on the turntable locking mechanism. These and other objects of the present apparatus are more fully discussed in the following summary, description, claims and illustrations.

SUMMARY

An aircraft tug apparatus for tugging an aircraft by an aircraft tire includes a main base portion, with the main base portion including a motive portion (such as wheels or tracks) for moving the aircraft tug across a surface, such as a tarmac. A turntable is coupled to the main base portion, the turntable configured to rotate relative to the main base portion, including rotating in a horizontal plane about a vertical spindle or axis. A cradle assembly is mounted on, or otherwise coupled to, the turntable with the cradle assembly configured to releasably hold the aircraft tire.

A latch assembly is provided on the turntable, with the latch assembly configured to releasably hold the cradle in a latched position. In the latched position, the aircraft tire is confined in the cradle assembly, preferably immovably. An actuation assembly is also provided, and may optionally be mounted to the main base portion. The actuation assembly includes a first plunger configured to arrest turntable rotation, including, for example, by impinging on the turntable. The actuation assembly also includes a second plunger configured to engage the latch assembly, such that the cradle moves from a latched position to an unlatched position when engaged by the second plunger.

In various alternative embodiments, the first plunger may be configured to arrest rotation of the turntable when the cradle assembly aligns the aircraft tire with the motive portion (i.e., in the direction of travel of the aircraft tire). The turntable may include a first hole sized to accommodate the first plunger, and a second hole sized to accommodate the second plunger. In some embodiments, the first hole and the second hole may represent portions of a single opening in the turntable. Preferably, the second hole is enlarged relative to the second plunger, thus preventing the second hole from impinging on the second plunger and allowing it unhindered access to the latch assembly.

The actuation assembly preferably comprises a pivoting arm on which the first plunger and the second plunger are mounted. A spring assembly couples the first plunger to the pivoting arm, and is configured such that the pivoting arm and the second plunger move independently of the first plunger if and when the first plunger is impinged on by the turntable and thus rendered immovable. In various alternative embodiments, the second hole may extend through the turntable, the second plunger may be configured to travel through the turntable to reach and engage the latch assembly, and the latch assembly may include a latch adjusting screw configured for impingement by the second plunger.

The apparatus may also be characterized as an aircraft tug for tugging an aircraft by an aircraft tire, the apparatus having a rotating turntable with a releasable tire cradle assembly thereon for capturing the aircraft tire. The apparatus preferably includes an actuation assembly having a first plunger and a second plunger, with both the first plunger and the second plunger connected or otherwise coupled to a pivoting arm. The first plunger is preferably mounted to the pivoting arm with a spring assembly, and configured to engage the turntable, thereby arresting rotational movement of the turntable, while the second plunger is configured to impinge on a latch mechanism of the tire cradle assembly to release the aircraft tire. Due to impingement of the first plunger by the turntable, the spring assembly allows the second plunger to move independent of the first plunger. Thus, if the first plunger is locked in place by the rotating turntable, the second plunger can still operate the latch mechanism.

In this embodiment, the first plunger is preferably configured to arrest turntable rotation when the cradle assembly aligns the tug with the aircraft tire (i.e., parallel to the aircraft tire direction of travel). The turntable preferably includes a first hole sized to accommodate the first plunger, and a second hole sized to accommodate the second plunger. Although the first hole and the second hole may be part of the same opening (i.e., two portions of a single opening), the second hole is preferably larger than the second plunger to prevent the turntable from impinging on the second plunger.

To move the first plunger and the second plunger, the actuation assembly preferably includes a pivoting arm on which the first plunger and the second plunger are mounted. A spring assembly preferably couples the first plunger to the pivoting arm. The spring assembly is arranged such that the pivoting arm and the second plunger can move independently of the first plunger when the first plunger is bound in place by turntable impingement. In one preferred embodiment, the second hole extends through the turntable and the second plunger is arranged to travel through the turntable to engage the latch assembly.

Finally the apparatus may be characterized as an aircraft tug for tugging an aircraft by an aircraft tire, with a turntable mounted on a main base portion of the apparatus, and the turntable configured to rotate relative to the main base portion. A tire cradle assembly is provided atop the turntable, for releasably holding the aircraft tire on the turntable, and an associated latch mechanism holds the tire cradle assembly in a position confining the aircraft tire, preferably so the tire is immobile when confined by the cradle assembly.

The turntable preferably includes a first hole and a second hole. A pivoting arm controlled by an actuation assembly is coupled to the main base portion, with the pivoting arm having a first plunger and a second plunger extending therefrom. The first plunger is coupled to the pivoting arm via a spring assembly which allows it to move up and down relative to the pivoting arm. The pivoting arm preferably extends under the turntable, and the spring assembly is configured such that the pivoting arm can move the second plunger, in one embodiment through the turntable, to engage the latch mechanism, even when the first plunger is locked in place from impingement by the turntable. In one alternative embodiment, the first hole and the second hole may be formed by a single opening as discussed above.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
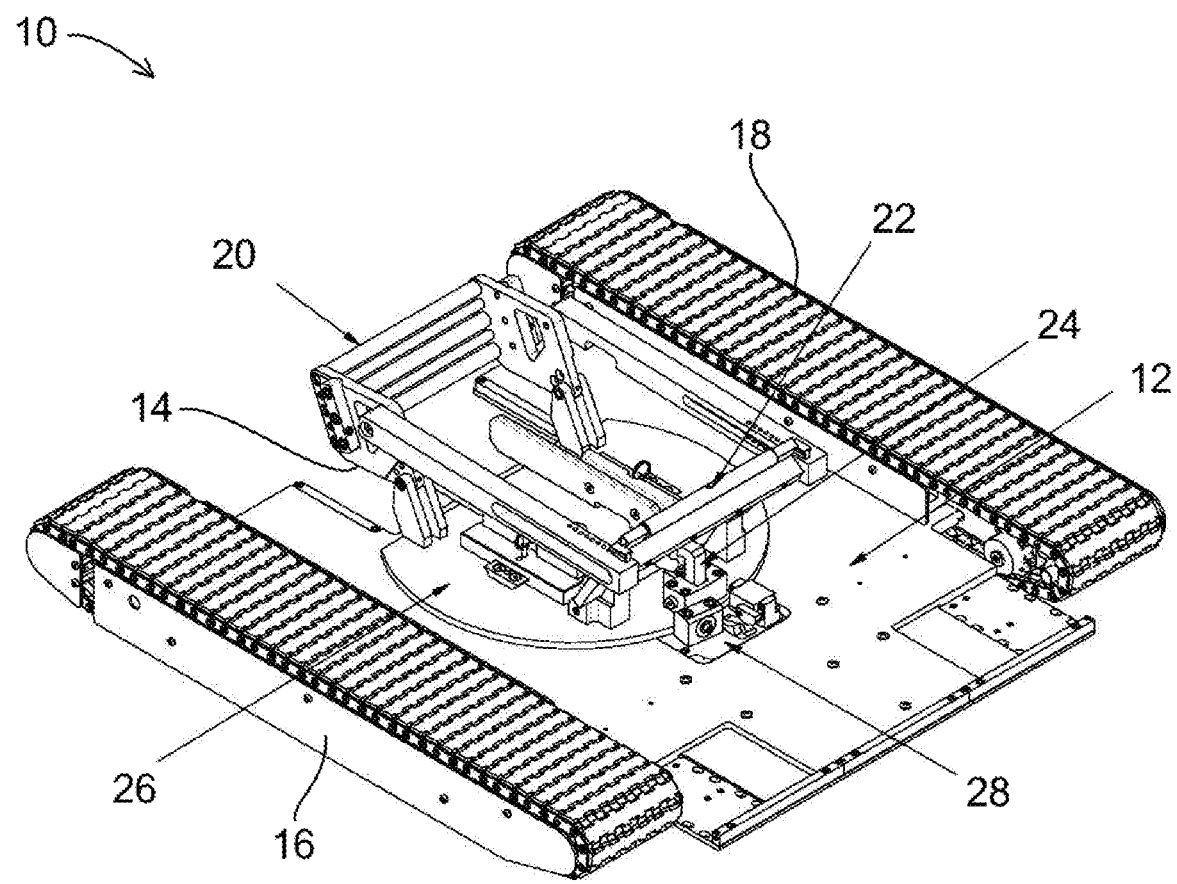
FIG. 1 illustrates a perspective view of an aircraft tug having a cradle with a latch and a turntable.

Referring to FIG. 1, the main components of an aircraft tug having a turntable with a multi-position latch are shown. The tug 10 includes a main base 12 with a tire cradle assembly 14 for holding a front aircraft tire (not shown), the main base 12 located between a first motive portion 16 and a second motive portion 18. Although the first motive portion 16 and the second motive portion 18 are shown as caterpillar track, wheels and other types of motive portions are contemplated for moving the main base 12 and the cradle assembly 14. The cradle assembly 14 preferably includes a front tire cradle 20 and a rear tire cradle 22 between which the aircraft tire rests when installed on the assembly.

A latch mechanism 24 holds the tire cradle assembly 14 in a confining position with the aircraft tire between the front tire cradle 20 and the rear tire cradle 22, allowing the aircraft tug 10 to pull the aircraft by the front tire. When the latch mechanism 24 is released, the front tire cradle 20 and the rear tire cradle 22 move in tandem, allowing the rear tire cradle 22 to lower down, and thus allowing the aircraft tire to roll on or off the aircraft tug 10 according to whether the aircraft is being installed on, or released from the tug 10.

Still referring to FIG. 1, the cradle assembly 14 and latch mechanism 24 are mounted on a turntable 26, allowing the main base 12 of the aircraft tug 10 to rotate relative to the aircraft tire, thus enabling a full range of movement when tugging the aircraft. The turntable 26 preferably locks in at least one position relative to the main base 12, and preferably in at least one position that preserves the tire cradle assembly 14 parallel to the direction of travel of the tug 10. An actuation assembly 28 is provided for selectively and individually releasing the latch mechanism 24 and the turntable 26. Preferably, the actuation assembly 28 is mounted on, or otherwise coupled to the main base 12 adjacent the turntable 26.

Figure 2:
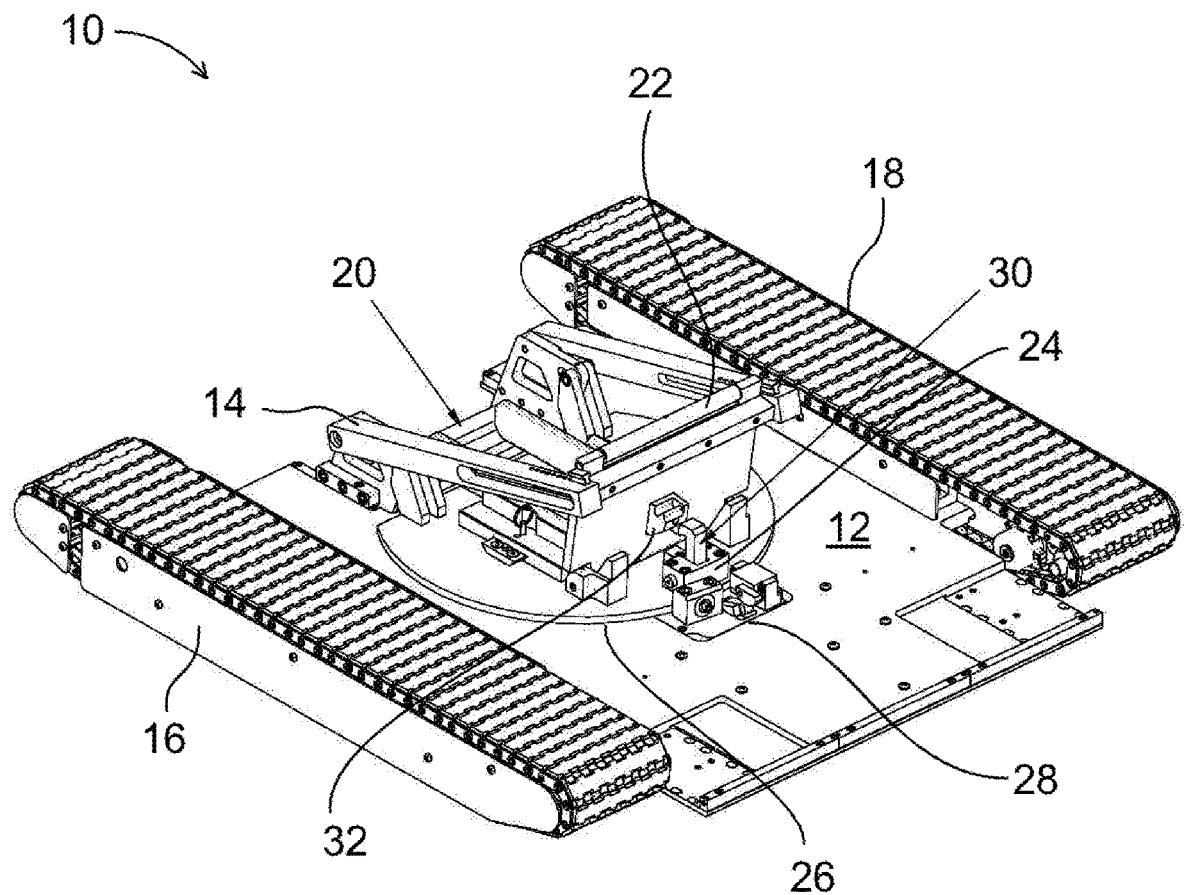
FIG. 2 illustrates the aircraft tug with the latch in an unlocked position and the turntable locked in a forward position.

Referring to FIG. 2, the latch mechanism 24 includes a hook 30 and a catch 32 for locking the tire cradle assembly 14 in position. When the hook 30 is released from the catch 32, the tire cradle assembly 14 allows the front tire cradle 20 to move down, thus allowing the aircraft tire to exit the tire cradle assembly 14. As shown in the illustrated view, the latch mechanism 24 is released with the turntable 26 locked in a position relative to the main base 12, such that the tire cradle assembly 14 is parallel to the first motive portion 16 and the second motive portion 18. Preferably, the actuation assembly 28 only permits the latch mechanism 24 to release the catch 32 when the turntable 26 is locked in this position.

Figure 3:
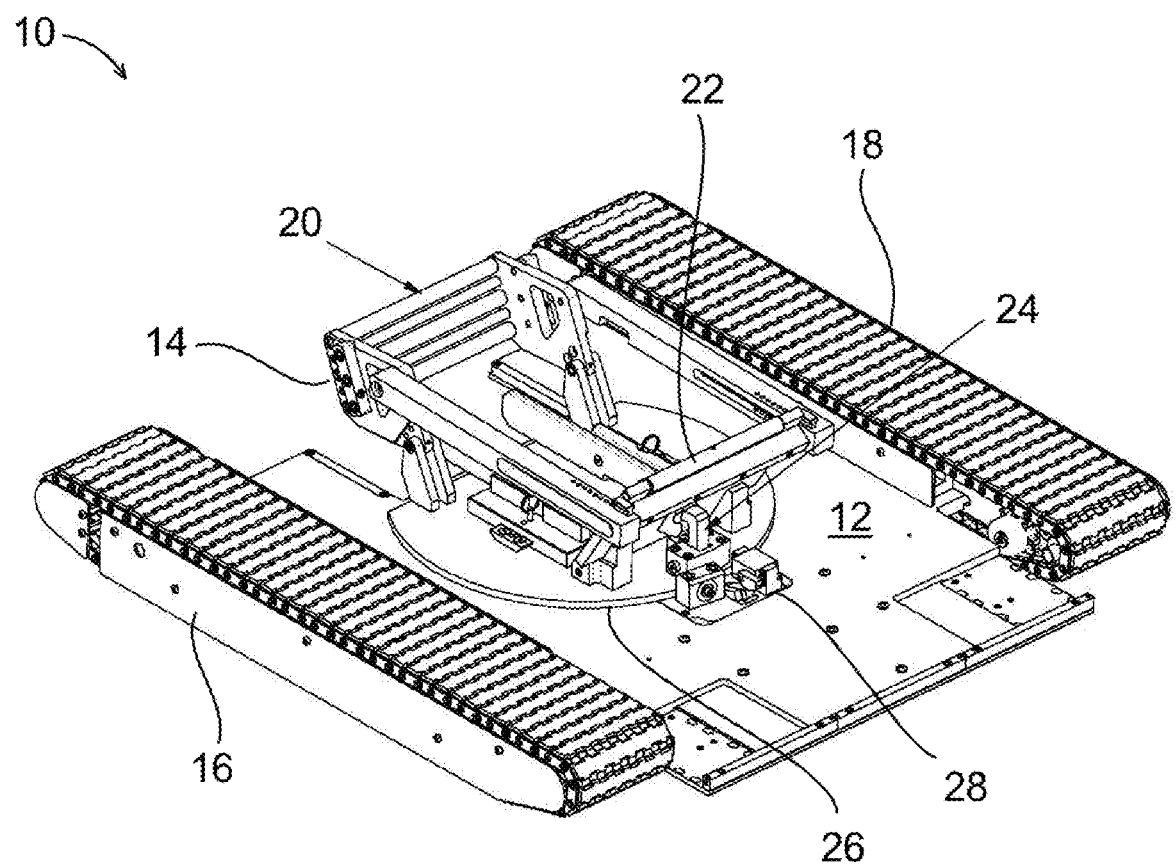
FIG. 3 illustrates the aircraft tug with the latch in a locked position and the turntable locked in a forward position.

Referring to FIG. 3, the latch mechanism 24 is shown in a latched position, with the front tire cradle 20 in a raised position and the turntable 26 locked in position relative to the main base 12. This configuration may be used when moving an aircraft in instances where movement of the turntable 26 is not desired. It is also the turntable 26 orientation and configuration required prior to releasing the aircraft tire from the cradle assembly 14.

Figure 4:
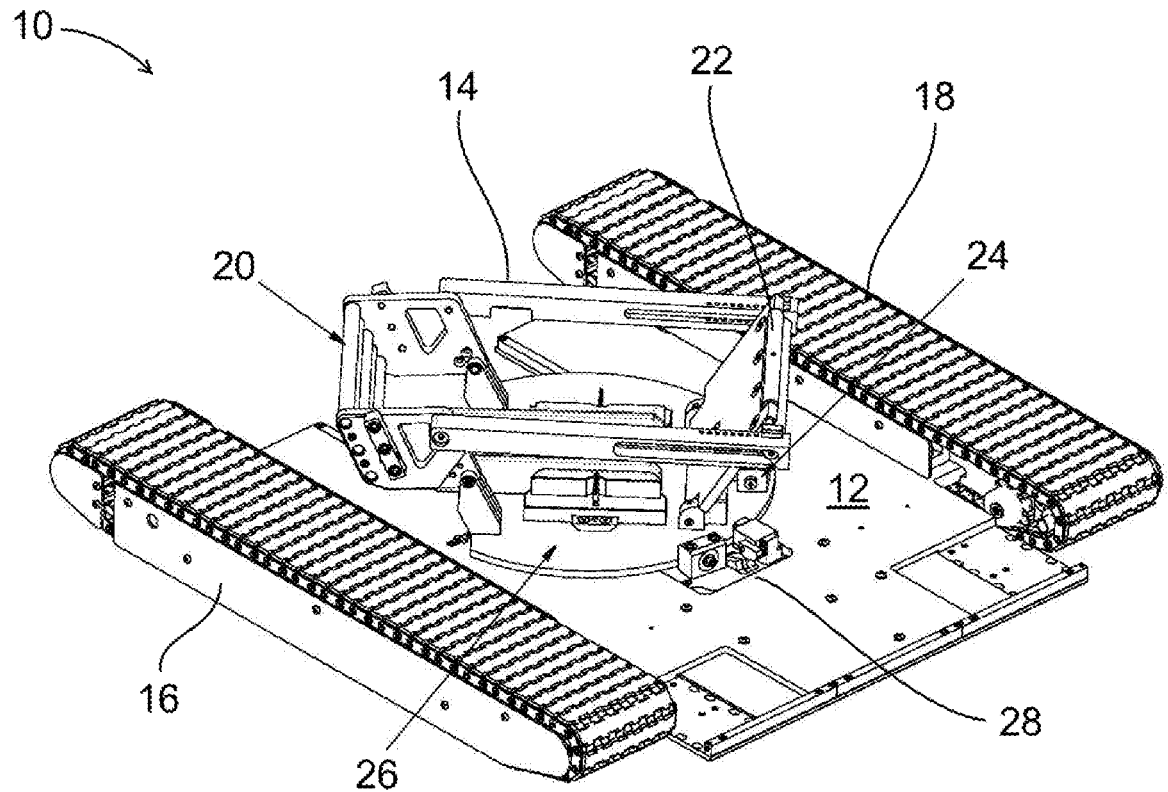
FIG. 4 illustrates the aircraft tug with the turntable unlocked rotated while the latch remains in a locked position.

Referring to FIG. 4, the latch mechanism 24 is shown in a locked position (i.e., holding the front tire cradle 20 in a raised position), but with the turntable 26 unlocked and able to rotate freely relative to the main base 12, away from the locked forward-facing position. This configuration may be used when towing an aircraft with the tire captured within the tire cradle assembly 14, particularly for performing sharp turns and for precise maneuvering in tight spaces. Thus, there are three configurations for the combination of the latch mechanism 24 and the turntable 26; a first configuration with the turntable 26 locked and the front tire cradle 20 lowered, a second configuration with the turntable 26 locked and the front tire cradle 20 raised, and a third configuration with the turntable 26 unlocked and front tire cradle raised 20.

Figure 5:
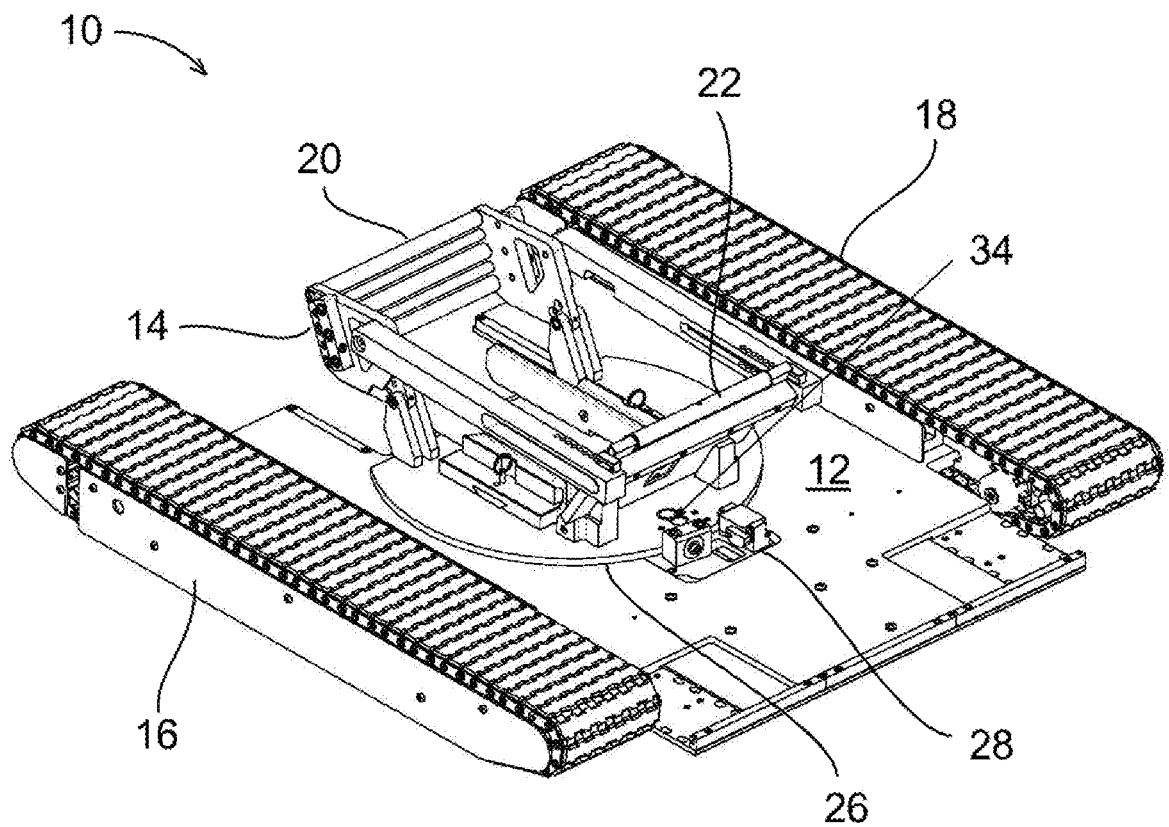
FIG. 5 illustrates the aircraft tug with the latch removed to illustrate a hole on the turntable for locking the turntable in a predetermined position.

Referring to FIG. 5, the aircraft tug 10 is shown with the front tire cradle 20 in the elevated position, and the turntable 26 locked in position. The latch mechanism 24 has been removed to reveal a first hole 34 in the turntable 26 used to lock the turntable in position. The turntable 26 is otherwise a free-turning assembly that can be locked by a first plunger 54 of the actuation assembly 28 being pushed into the first hole 34 on the turntable 26. A second hole 36 is also provided for receiving a second plunger 56 (FIGS. 6-9) that actuates the latch mechanism 24. As discussed above, while two discreet holes are shown, in various alternative embodiments, a single opening may be provided with first and second portions representing the first hole 34 and the second hole 36.

Figure 6:
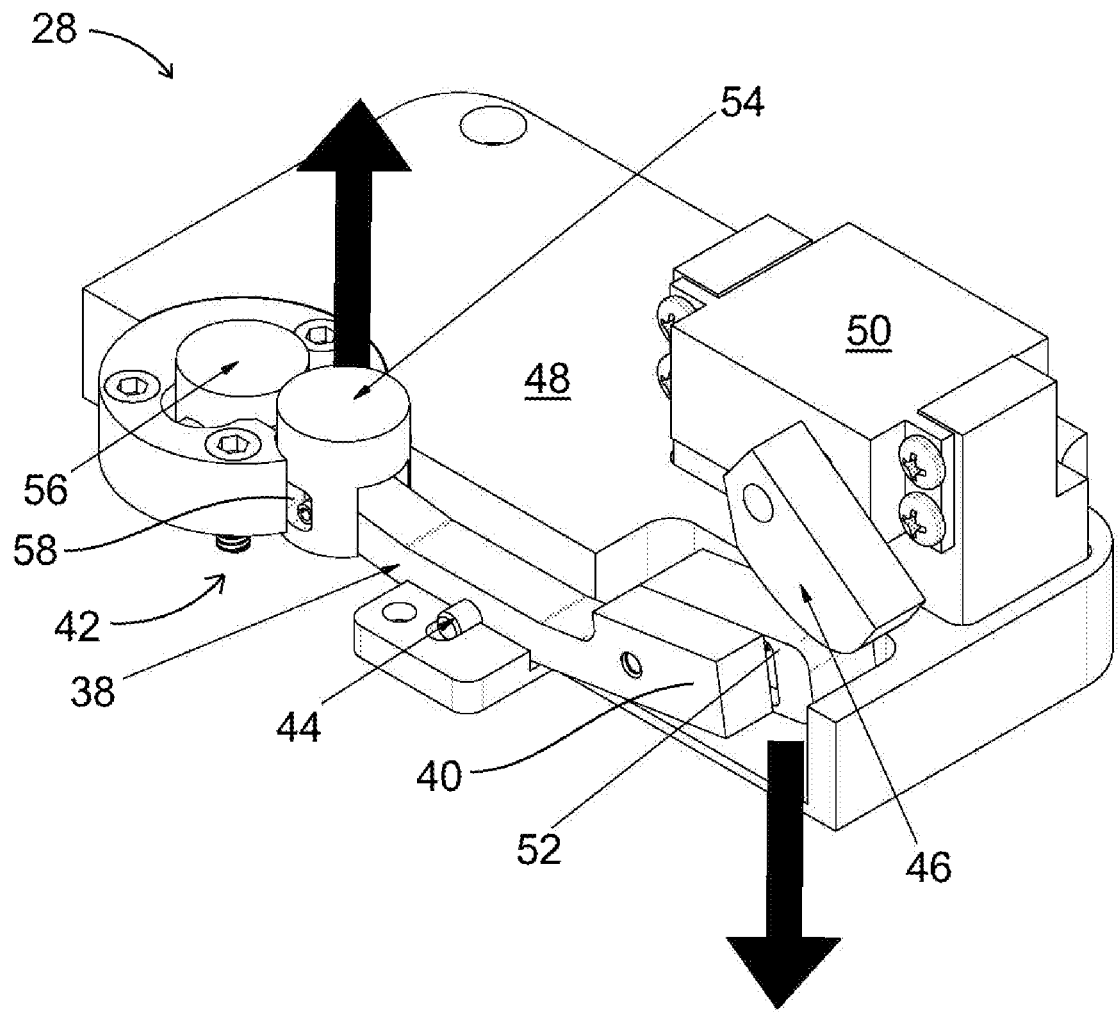
FIG. 6 illustrates a perspective view of an actuation assembly of the aircraft tug.

Referring to FIG. 6, the actuation assembly 28 is shown in close-up view. The actuation assembly 28 includes a pivoting arm 38 having a first end 40 and a second end 42, and which pivots on a pivot axis 44 between them. A rotating actuator 46 is configured to urge the first end 40 downward, thus raising the second end 42 due to the pivoting action of the pivot axis 44. In a preferred embodiment, the pivoting arm 38 is biased to urge the first end 40 to a raised position. The actuation assembly 28 may also include a base 48 onto which the pivoting arm 38 is mounted, and a motor housing 50 for housing a motor (not shown) to which the motorized actuator 46 is coupled for operation. Additionally, the first end 40 may include an engaging lever 52 ensuring effective engagement of the rotating actuator 46 against the pivoting arm 38.

Still referring to FIG. 6, the second end 42 of the pivoting arm 38 preferably includes a first plunger 54 and a second plunger 56. The first plunger 54 and the second plunger 56 are preferably disposed adjacent to one another, and the actuation assembly 28 is preferably mounted to the main base 12 of the tug 10 such that the first plunger 54 and the second plunger 56 can move in and out of the first hole 34 and the second hole 36, respectively. As discussed, the first hole 34 and the second hole 36 may be independent structures, or may each form a portion of a single opening or aperture. The first plunger 54 also includes a spring assembly 58, configured to allow the first plunger 54 to move relative to the pivoting arm 38. The spring assembly 58 preferably maintains the first plunger 54 in an elevated position relative to the pivoting arm 38. The hook 30 also preferably includes a latch adjusting screw 60 for adjusting the height at which the second plunger 56 engages the hook 30 to release it from the catch 32.

Figure 7:
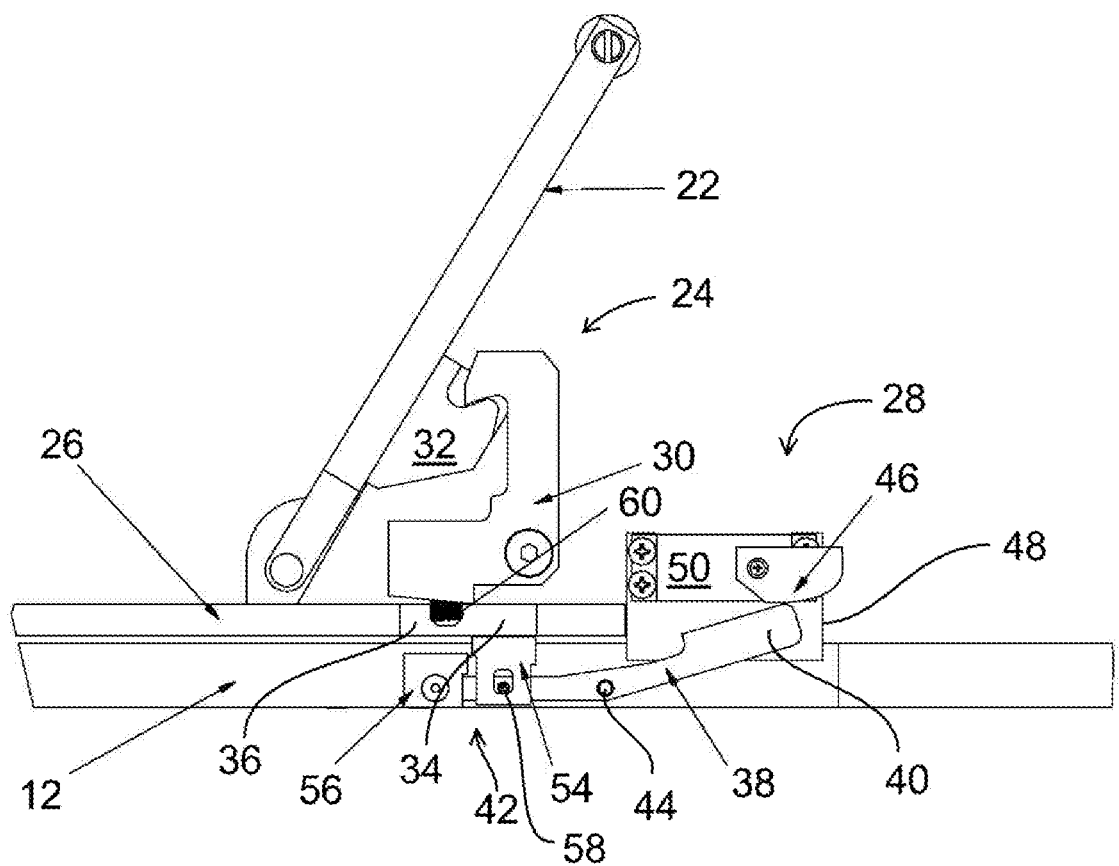
FIG. 7 illustrates a side view of the actuation assembly in a first operational position.

Referring to FIG. 7, the turntable 26 and actuation assembly 28 are shown in a first position, wherein the latch mechanism 24 is engaged (i.e., the hook 30 and catch 32 are engaged) to secure an aircraft tire, with the turntable 26 allowed to rotate freely. The rotating actuator 46 is in a fully retracted position, allowing the pivoting arm 38 to rest in its biased position, with the first end 40 raised, and the second end 42 lowered. Thus, the first plunger 54 and the second plunger 56 clear the first hole 34 and the second hole 36 on the turntable 26, and the turntable 26 and tire cradle assembly 14 can move independently of the main base 12 as the tug 10 moves.

Figure 8:
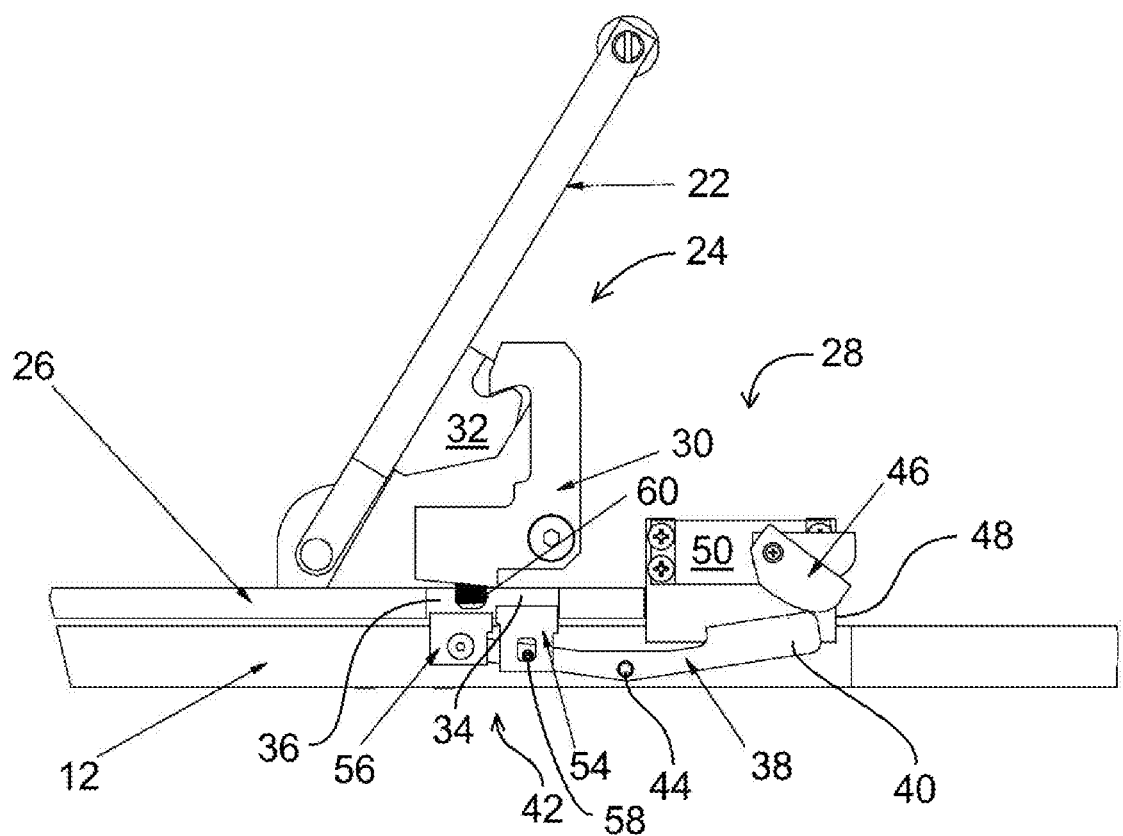
FIG. 8 illustrates a side view of the actuation assembly in a second operational position.

Referring to FIG. 8, the turntable 26 and actuation assembly 28 are shown in a second position, wherein the latch mechanism 24 is engaged to secure an aircraft tire, with the turntable 26 locked in a static position. In this position, the rotating actuator 46 has been partially rotated, such that the first plunger 54 presses against the turntable 26 from below, thereby compressing the spring assembly 58 coupling the first plunger 54 to the pivoting arm 38. When the first plunger clears the first hole 34, the spring assembly 58 urges the first plunger 54 into the first hole 34, locking the turntable 26 in position. While the first plunger 54 enters the first hole 34 with the rotating actuator 46 in this position, the second plunger 56 has not entered the second hole 36, nor has it made contact with the latch adjusting screw 60. Thus, although the turntable is locked in position, the latch mechanism 24 has not been activated, and the tire cradle assembly 14 retains the aircraft tire on the tug 10. The turntable 26 and tire cradle assembly 14 may not move independently of the main base 12 as the tug 10 moves.

Figure 9:
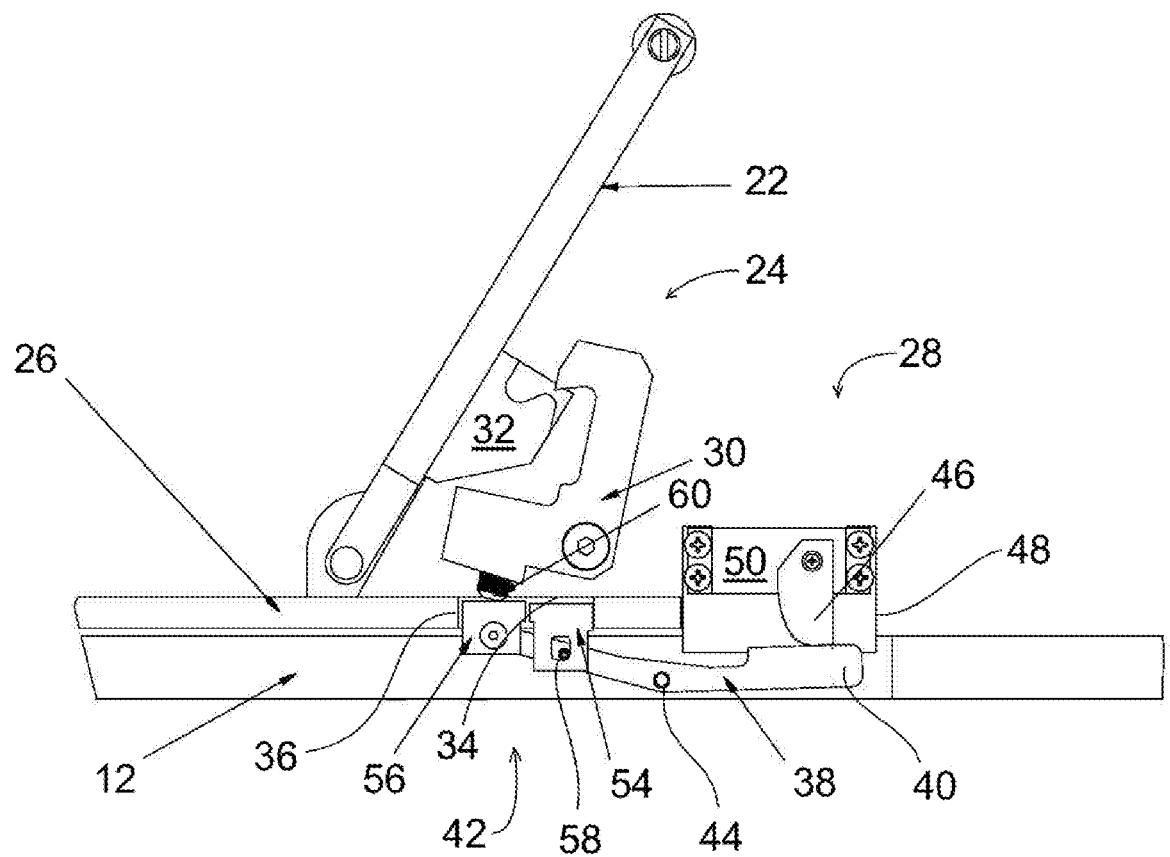
FIG. 9 illustrates a side view of the actuation assembly in a third operational position.

Referring to FIG. 9, the turntable 26 and actuation assembly 28 are shown in a third position, wherein the latch mechanism 24 has been disengaged to release the aircraft tire, while the turntable 26 remains locked in a static position. In this position, the rotating actuator 46 has been fully rotated, such that the first plunger is urged into the first hole 34 and the second plunger 56 is urged into the second hole 36, making contact with the latch adjusting screw 60 and pushing it upward. As shown in FIG. 9, in a preferred embodiment, the first plunger 54 and first hole 34 may be configured such that when the first plunger 54 enters the first hole 34 and binds against the turntable 26 (due to rotational movement of the turntable laterally engaging the first plunger), the second plunger 56 and the second hole 36 are configured such that a space exists between them, thus allowing free movement of the second plunger when activating the latch mechanism 24. This action is facilitated by providing the spring assembly 58 between the pivoting arm 38 and the first plunger 54, which allows the pivoting arm 38 to raise the second plunger 56 even when the first plunger 54 is bound up by the turntable 26.

The structure and features of the apparatus having been shown and described, its method of operation will now be discussed.

In the prior art, a single plunger embodiment was used, both to stop rotation of the turntable 26 (when pushed halfway up), and release the cradle assembly 14 (when pushed all the way up). The flaw in such a design is that the single plunger is impinged on by the turntable 26—due to the aforementioned lateral movement of the turntable 26—such that it could not move further up to unlatch the cradle assembly 14. By using a first plunger 54 to stop rotation of the turntable 26, and a second plunger 56 to unlatch the cradle assembly 14, this problem is avoided.

Referring to FIGS. 1-9, when a user desires to engage an aircraft with the tug 10, the aircraft tire is rolled onto the tug 10 and into the unlatched tire cradle assembly 14, with the front cradle 20 lowered to accept the aircraft tire and the rear cradle 22 disengaged from the hook 30 (i.e., the latch mechanism 24 is released). As the aircraft tire rolls forward, it urges the rear cradle 22 into the hook 30, thus locking the latch mechanism 24 and retaining the aircraft tire in the tire cradle assembly 14 on the tug 10. The aircraft can then be transported to a desired location. While the turntable 26 is unlocked, with the first plunger 54 and the second plunger 56 are lowered by virtue of the rotating actuator acting on the pivoting arm, the turntable 26. The latch mechanism 24 remains locked and may rotate freely with the cradle assembly 14 as shown in FIG. 7.

During this action, the cradle assembly 14 cannot release the aircraft tire because the first plunger 54 and the second plunger 56 are not lined up with the first hole 34 and the second hole 36, thus preventing the second plunger 56 from acting on the latch mechanism 24. Because the first plunger 54 and the second plunger 56 are lowered away from the turntable 26, the turntable 26 and tire cradle assembly may rotate freely with respect to the main base 12, even up to 360 degrees of rotation, and the tug 10 can thus more easily maneuver the aircraft.

To achieve a locked turntable 26 towing configuration, the rotating actuator 46 is rotated to the position shown in FIG. 8, to impinge on the pivoting arm 38 wherein the first plunger 54, spring loaded by the spring assembly 58 engages the bottom of the turntable 26. As the turntable 26 rotates relative to the main base 12 to which the actuation assembly 28 is affixed, the first hole 34 and second hole 36 eventually align with the first plunger 54 and the second plunger 56. During a tug operation, the first plunger 54 can be actuated from a lowered position to a locking position by rotating the rotating actuator 46 as discussed above, such that it slides under the turntable 26. Thereafter, when the turntable 26 rotates such that the first plunger 54 reaches the first hole 34 (and consequently the second hole 36 aligns with the second plunger 56), the spring assembly 58 under the first plunger 54 causes it to spring up into the first hole 34, thereby arresting further rotational movement of the turntable 26 and locking the tire cradle assembly 14 (and thus the aircraft tire) in a position aligned with the direction of travel of the main base 12.

As discussed above, when the first plunger 54 engages the first hole 34 on the turntable 26, if the turntable 26 rotates slightly, it can bind the first plunger 54 so the first plunger 54 cannot move any further. However, with the first plunger 54 being spring loaded by virtue of the spring assembly 58 on the pivoting arm 38, the pivoting arm 38 may continue to move freely, pushing the second plunger 56 up to act on the latch mechanism 24, unlocking it.

With the first plunger 54 in its elevated position in the first hole 34, the rotating actuator 46 may be rotated to the position shown in FIG. 9, which further depresses the first end 40 of the pivoting arm 38, thus elevating the second end 42, including the first plunger 54 and second plunger 56. If the first plunger is not bound by the turntable 26 in the first hole 34, the first plunger 54 may travel through the first hole 34 in tandem with the second plunger 56 as it travels through the second hole 36 and impinges against the latch adjusting screw 60, thereby disengaging the latch mechanism 24. In the event the first plunger 54 is bound in the first hole 34 by impingement from the turntable 26, the spring assembly 58 allows the pivoting arm 38 to continue moving relative to the first plunger 54, thus elevating the second plunger 56 into position, ultimately unlatching the latch mechanism 24.

With the latch mechanism 24 released, the tire cradle assembly 14 can release the aircraft tire by virtue of the front tire cradle 20 lowering down and the rear tire cradle 22 moving toward the front tire cradle 20, allowing the aircraft tire to roll off the tug 10. The tug 10 may then be stored or employed in the transport of another aircraft.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An aircraft tug apparatus for tugging an aircraft by an aircraft tire, the apparatus comprising:
    a main base portion, the main base portion comprising a motive portion for moving the apparatus across a surface;
    a turntable coupled to the main base portion, the turntable configured to rotate relative to the main base portion;
    a cradle assembly on the turntable, the cradle assembly configured to releasably hold the aircraft tire;
    a latch assembly on the turntable, the latch assembly configured to releasably hold the cradle in a latched position wherein the aircraft tire is confined in the cradle assembly; and
    an actuation assembly, the actuation assembly having a first plunger configured to arrest turntable rotation, and a second plunger configured to engage the latch assembly such that the cradle moves from a latched position to an unlatched position.

2. The apparatus of claim 1 wherein the first plunger is configured to arrest turntable rotation when the cradle assembly aligns the aircraft tire with the motive portion.

3. The apparatus of claim 1 wherein the turntable comprises a first hole sized to accommodate the first plunger.

4. The apparatus of claim 1 wherein the turntable comprises a second hole sized to accommodate the second plunger.

5. The apparatus of claim 4 wherein the second hole is larger than the second plunger.

6. The apparatus of claim 1 wherein the actuation assembly comprises a pivoting arm on which the first plunger and the second plunger are mounted.

7. The apparatus of claim 6 further comprising a spring assembly coupling the first plunger to the pivoting arm, configured such that the pivoting arm and the second plunger move independently of the first plunger when the first plunger is bound in place by the turntable.

8. The apparatus of claim 4 wherein the second hole extends through the turntable.

9. The apparatus of claim 8 wherein the second plunger is configured to travel through the turntable to engage the latch assembly.

10. The apparatus of claim 9 wherein the latch assembly comprises a latch adjusting screw configured for impingement by the second plunger.

11. An aircraft tug apparatus for tugging an aircraft by an aircraft tire, the apparatus comprising:
    a rotating turntable having a releasable tire cradle assembly for capturing the aircraft tire;
    an actuation assembly having a first plunger and a second plunger coupled to a pivoting arm, the first plunger having a spring assembly;
    the first plunger configured to engage the turntable and arrest rotational movement of the turntable;
    the second plunger configured to impinge on a latch mechanism of the tire cradle assembly;
    wherein the spring assembly is configured such that the second plunger moves independently of the first plunger when the first plunger is locked in place by the rotating turntable.

12. The apparatus of claim 11 wherein the first plunger is configured to arrest turntable rotation when the cradle assembly aligns the aircraft tire with the tug apparatus.

13. The apparatus of claim 11 wherein the turntable comprises a first hole sized to accommodate the first plunger.

14. The apparatus of claim 11 wherein the turntable comprises a second hole sized to accommodate the second plunger.

15. The apparatus of claim 14 wherein the second hole is larger than the second plunger.

16. The apparatus of claim 11 wherein the actuation assembly comprises a pivoting arm on which the first plunger and the second plunger are mounted.

17. The apparatus of claim 16 further comprising a spring assembly coupling the first plunger to the pivoting arm, configured such that the pivoting arm and the second plunger move independently of the first plunger when the first plunger is bound in place by the turntable.

18. The apparatus of claim 14 wherein the second hole extends through the turntable and the second plunger is configured to travel through the turntable to engage the latch assembly.

19. An aircraft tug apparatus for tugging an aircraft by an aircraft tire, the apparatus comprising:
   a turntable mounted on a main base portion of the apparatus, the turntable configured for rotational movement relative to the main base portion;
   a tire cradle assembly for releasably holding the aircraft tire on the turntable, and a latch mechanism for holding the tire cradle assembly in a position confining the aircraft tire;
   the turntable having a first hole and a second hole;
   a pivoting arm controlled by an actuation assembly coupled to the main base portion, the pivoting arm having a first plunger and a second plunger extending therefrom, with the first plunger coupled to the pivoting arm with a spring assembly; and
   wherein the spring assembly is configured such that the pivoting arm is capable of moving the second plunger to engage the latch mechanism when the first plunger is locked in place by the turntable.

20. The apparatus of claim 19 wherein the first hole and the second hole are formed by a single opening.

\* \* \* \* \*